May 23, 1933.  E. D. TILLYER  1,910,576
SOUND REPRODUCTION
Original Filed Feb. 2, 1931
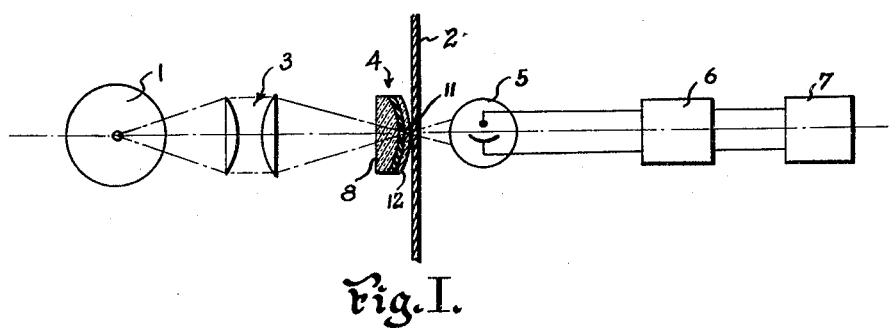
Fig. I.
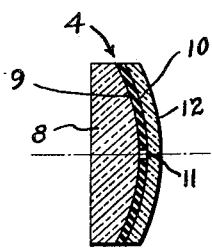 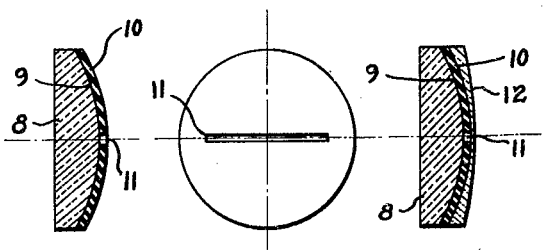
Fig. II.   Fig. III.   Fig. IV.   Fig. V.
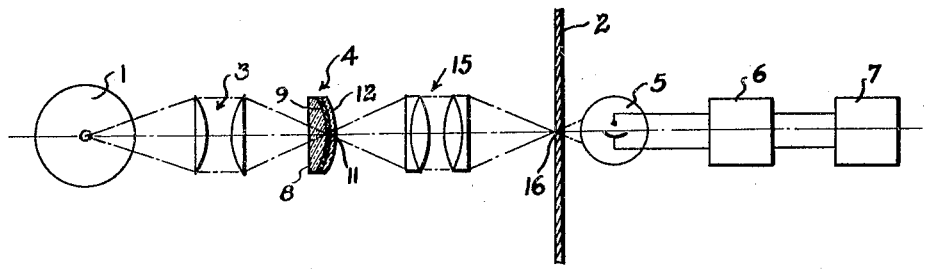
Fig. VI.
INVENTOR
Edgar D. Tillyer.
BY
Harry H. Styll
ATTORNEY Patented May 23, 1933

1,910,576

UNITED STATES PATENT OFFICE

EDGAR D. TILLYER, OF SOUTHBRIDGE, MASSACHUSETTS, ASSIGNOR TO RADIO CORPORATION OF AMERICA, A CORPORATION OF DELAWARE

SOUND REPRODUCTION

Application filed February 2, 1931, Serial No. 512,943. Renewed March 9, 1933.

This invention relates to improvements in sound reproducing devices and has particular reference to an improved device for sound reproduction by means of a photo-electric or photo-sensitive cell.

The principal object of the invention is to provide an improved light slit in devices of this character.

Another object of the invention is to provide an improved light slit device that will be dust proof and prevent the gathering of dust and/or other particles at the edges of the slit.

Another object of the invention is to provide improved means in a sound device, simple and economical in construction that will make unnecessary the use of expensive finely adjusted lenses or lens systems thereby reducing materially the cost of production of the sound reproducing system.

Another object of the invention is to produce an improved sound reproducing system permitting the focusing of the light on the film without the use of expensive finely adjusted lenses or lens systems.

Another object of the invention is the production of an improved sound reproduction system in which the light slit is placed in close proximity of the film without the use of expensive air tight appliances to protect the slit.

Another object of the invention is to provide improved means for producing the light streak on the film which will not require dust brushes or other mechanical means to keep the light slit clear.

Other objects and advantages of the invention will become apparent from the following description taken in connection with the accompanying drawing. It will be apparent that many changes in the details of construction and arrangement of parts may be made without departing from the spirit of the accompanying claims, I, therefore, do not wish to be limited to the exact arrangements shown and described as the preferred forms only have been shown and described by way of illustration.

Referring to the drawing:

Fig. I is a diagrammatic view of a sound reproducing system embodying the invention;

Fig. II is a cross section of the light slit;

Fig. III is a cross section of a modified form of light slit;

Fig. IV is a front view of the light slit;

Fig. V is a cross section of another modified form of light slit, and

Fig. VI is a diagrammatic view of a sound reproducing system showing a modified arrangement.

In the reproduction of sound in combined motion picture projection and sound reproduction machines two methods have been employed. In one the light slit was placed close to the film but the edges of the slit being unprotected allowed dust and foreign particles and material to collect on the edges of the slit and adjacent thereto with objectionable and disastrous results as far as perfect reproduction was concerned. The other method employed was to place the light slit relatively remote from the film, and to house it in an air tight dust proof covering. This necessitated the use of expensive and finely adjusted lenses or lens system to get the light clearly and sharply focused on the film. The light slit in these methods was also liable to move, turn and get out of focus. It is therefore the prime object of my invention to provide simple and cheap means that will avoid the objection of the dust and dirt collection on the edges of the slit and also to avoid the use of expensive and finely adjusted lenses and lens systems together with the expensive, bulky and cumbersome housings to make the light slit air tight and dust proof, and also to insure the stability of position of the light slit.

Referring to the accompanying drawing in which like numerals refer to similar parts throughout the light source is represented by the numeral 1. The light is focused on the film 2 by means of the lens or lens system 3. This lens is preferably a compound lens. Adjacent to, and preferably contacting with the film is my improved light slit device 4 which will be described in detail hereinbelow. The light is projected through the film onto the photo-electric or photo-sensitive cell 5, the electrical impulses are amplified by the amplifier 6 and emitted by the loud speaker 7, in the usual way.

The light slit device 4 comprises a base member or block 8 of quartz, glass or other transparent material the face 9 of which is preferably finished to a cylindrical surface with the axis normal to the length of the film. Over this face 9 is placed a coating 10 of opaque material such as a film of gold, platinum or other metal or material. Across the face of this coating is cut or scribed the slit line 11 of the desired width. This cut extends clear through the coating and the edges of the cut are clear and sharp. If desired a cover plate 12 is placed over the coating its outer surface being preferably curved. The shape of the light slit device is circular as shown but other shapes may be used. The cover plate 12 is preferably thin adjacent the slit 11 as shown in Fig. V so that the film may be brought as close as possible to the slit. The face of the light slit device being curved allows the film to contact with it tangentially at the slit section. Where no cover plate is used the slit can approach more closely to the film but it is exposed to wear by the moving film. The face of the light slit device being curved facilitates the movement of the film thereover.

In operation the light is projected through the cut 11 in the coating 10 through the film onto the photo-electric or photo-sensitive cell.

In Fig. VI I have shown a modified arrangement wherein the lenses 3 do not focus the light on the film as in Fig. I but an additional lens system 15 is interposed between the light slit member 4 and the film 2 which lens system focusses the light streak on the film at 16. The lenses 15 will focus the light streak on the film 2 much more accurately than in the arrangement shown in Fig. I. The lenses 3 do not have to be focussed accurately or so finely as the lenses 15. While the arrangement shown in Fig. I is essentially practical, efficient and economical that shown in Fig. VI is much more refined and accurate although of course more expensive.

From the foregoing it will be seen that I have provided a light slit device that can be used close up to the film, that the slit is protected from dust and dirt accumulation, that no air tight and dust proof compartments are necessary, and that no expensive lenses or lens systems are required to focus the slit on the film, and that I have provided an improved device and have eliminated considerable of the cost of production of prior art devices.

Having described my invention I claim:

1. A light slit device comprising a transparent base having a continuous cylindrical surface on one side thereof, an opaque coating on the cylindrical surface, said coating having a light slit therethrough, the longitudinal axis of the slit extending substantially parallel with the axis of the cylinder and a transparent covering over the coating, said covering having a contra generic cylindrical surface shaped to fit the coated cylindrical surface of the base and having its exposed surface formed with a continuous curvature which is of a different radii than that of the cylindrical surface.

2. In a sound reproducing device, a source of light, a film, a light slit device comprising a transparent base having a cylindrical surface thereon, the axis of which is normal to a line parallel with the length of the film, an opaque coating on the cylindrical surface having a slit therein, the longitudinal axis of the slit lying substantially parallel with the axis of the cylinder, a transparent covering over the coating, means between the cylindrical light slit device and light source to focus the light on the light slit, means between the light slit device and film to focus the light on the film and a photo-sensitive cell in the path of the light projected through the film on the side opposite the light source.

3. In a sound reproducing device, a source of light, a film, a light slit device comprising a transparent base having a continuous cylindrical surface thereon, the axis of which is normal to a line parallel with the length of the film, an opaque coating on the cylindrical surface having a slit therein, the longitudinal axis of the slit lying substantially parallel with the axis of the cylinder, a transparent covering over the coating, said covering having a contra generic cylindrical surface shaped to fit the coated cylindrical surface of the base and having its exposed surface formed with a continuous curve of a different radii, means between the cylindrical light slit device and light source to focus the light on the light slit, means between the light slit device and film to focus the light on the film and a photo-sensitive cell in the path of the light projected through the film on the side opposite the light source.

4. In a sound reproducing device, a source of light, a film, a light slit device comprising a transparent base having an opaque coating thereon, the said opaque coating having a slit therein, the longitudinal axis of the slit lying normal to a line parallel with the length of the film, a transparent covering over the coating, said covering having a surface shaped to fit the coated surface of the transparent base and having its exposed face formed with a continuous surface of a different radii, a pair of projection lenses between the light slit device and light source to focus the light on the light slit, a pair of projection lenses between the light slit device and film to focus the light on the film and a photo-sensitive cell in the path of the light projected through the film on the side opposite the light source.

5. A light slit device comprising a transparent base having a continuous curved surface on one side thereof, an opaque coating on the continuous surface, said coating having a light slit therethrough, and a transparent covering over the coating, said covering having a surface shaped to fit the curved coated surface of the base and having its exposed face formed with a continuous curved surface of a different radii.

6. A light slit device comprising a transparent base having a continuous curved surface on one side thereof, an opaque coating on the curved surface, said coating having a slight slit therethrough, and a transparent covering over the coating, said covering being shaped to fit the curved coated surface of the base and having its exposed face formed with a continuous curved surface which is of a radius greater than that of the radius of the surface shaped to fit the coating.

EDGAR D. TILLYER.